US010095279B2

United States Patent
Burghart et al.

(10) Patent No.: US 10,095,279 B2
(45) Date of Patent: Oct. 9, 2018

(54) ASSEMBLY FOR A COMPUTER SYSTEM AND CABLE COVERING UNIT FOR AN ASSEMBLY

(71) Applicant: Fujitsu Technology Solutions Intellectual Property GmbH, München (DE)

(72) Inventors: Andreas Burghart, Königsbrunn (DE); August Scherer, Dinkelscherben (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 15/426,721

(22) Filed: Feb. 7, 2017

(65) Prior Publication Data

US 2017/0235346 A1 Aug. 17, 2017

(30) Foreign Application Priority Data

Feb. 12, 2016 (DE) .................... 20 2016 100 727 U

(51) Int. Cl.
*H05K 5/00* (2006.01)
*G06F 1/18* (2006.01)

(52) U.S. Cl.
CPC ................... *G06F 1/183* (2013.01)

(58) Field of Classification Search
CPC .. H05K 5/00; H05K 7/14; G06F 1/181; G06F 2200/1639; G06F 21/86
USPC .......................... 361/679.58, 726; 312/223.2
See application file for complete search history.

(56) References Cited

U.S. PATENT DOCUMENTS

| 3,916,756 | A | * | 11/1975 | Yoda ..................... F16B 21/073 |
| | | | | 24/682.1 |
| 4,898,009 | A | * | 2/1990 | Lakoski .................. E05B 73/00 |
| | | | | 439/133 |
| 4,985,695 | A | * | 1/1991 | Wilkinson .............. G06F 21/86 |
| | | | | 200/43.02 |
| 5,383,096 | A | * | 1/1995 | Benson ................ H05K 7/1449 |
| | | | | 174/17 R |
| 5,568,359 | A | | 10/1996 | Cavello et al. |
| 5,568,362 | A | * | 10/1996 | Hansson ................ H02B 1/305 |
| | | | | 174/50 |
| 5,810,461 | A | * | 9/1998 | Ive .......................... G06F 1/181 |
| | | | | 220/242 |

(Continued)

FOREIGN PATENT DOCUMENTS

DE 93 08 024.7 U1 11/1993
DE 20 2005 016 892 U1 12/2005

(Continued)

OTHER PUBLICATIONS

CN 106445008 abstract and drawing Feb. 2017.*

*Primary Examiner* — Janet M Wilkens
(74) *Attorney, Agent, or Firm* — DLA Piper LLP (US)

(57) ABSTRACT

An assembly for a computer system includes a computer chassis having a back panel with a connector panel; a cable covering unit fixable in a mounting position to the back panel that prevents connected plug connectors from being unplugged from the connector panel in the mounting position; wherein the cable covering unit and the computer chassis are arranged such that the cable covering unit can be placed on the computer chassis in an articulated manner to be fixed thereto and subsequently pivoted toward the back panel into the mounting position.

12 Claims, 4 Drawing Sheets

(56) References Cited

U.S. PATENT DOCUMENTS

| | | | | |
|---|---|---|---|---|
| 6,122,019 | A * | 9/2000 | Do | G06F 1/1601 348/839 |
| 6,236,564 | B1 * | 5/2001 | Fan | F04D 25/12 165/80.3 |
| 6,286,916 | B1 * | 9/2001 | Chen | G06F 1/181 312/223.2 |
| 6,927,968 | B2 * | 8/2005 | Pols Sandhu | G06F 1/181 312/223.1 |
| 6,934,148 | B2 * | 8/2005 | Gorenz, Jr. | H05K 7/20727 165/80.2 |
| 6,954,354 | B2 * | 10/2005 | Shyr | G06F 1/183 312/223.1 |
| 7,151,666 | B2 * | 12/2006 | Song | H05K 7/1487 361/692 |
| 8,059,398 | B2 * | 11/2011 | Chang | G06F 1/181 312/223.2 |
| 8,254,117 | B2 * | 8/2012 | Tang | G06F 1/181 248/551 |
| 8,789,858 | B2 * | 7/2014 | Loret de Mola | E05L 35/00 292/164 |
| 8,811,001 | B2 * | 8/2014 | Iwamoto | G06F 1/1616 345/169 |
| 9,137,922 | B2 * | 9/2015 | Lin | H05K 7/1487 |
| 2002/0159229 | A1 * | 10/2002 | Searby | G06F 1/181 361/679.58 |
| 2003/0111244 | A1 * | 6/2003 | Woolsey | H05K 5/0226 174/50 |
| 2004/0119384 | A1 * | 6/2004 | Davis | G06F 1/181 312/223.2 |
| 2005/0099766 | A1 * | 5/2005 | Fraley | G11B 27/36 361/679.33 |
| 2005/0213295 | A1 * | 9/2005 | Perez | G06F 1/181 361/679.57 |
| 2005/0265003 | A1 * | 12/2005 | Coglitore | G06F 1/182 361/724 |
| 2006/0285282 | A1 * | 12/2006 | Chen | G06F 1/18 361/679.58 |
| 2007/0247035 | A1 * | 10/2007 | Chen | A47B 47/02 312/223.2 |
| 2009/0059514 | A1 * | 3/2009 | Chi | G06F 1/20 361/679.49 |
| 2009/0268412 | A1 * | 10/2009 | Lee | G06F 1/181 361/726 |
| 2010/0039769 | A1 * | 2/2010 | Saisila | E05B 63/0008 361/679.58 |
| 2012/0274191 | A1 * | 11/2012 | Chen | G06F 1/181 312/223.2 |

FOREIGN PATENT DOCUMENTS

DE 20 2007 000 829 U1 3/2007
DE 20 2008 014 105 U1 2/2009

* cited by examiner

ASSEMBLY FOR A COMPUTER SYSTEM AND CABLE COVERING UNIT FOR AN ASSEMBLY

TECHNICAL FIELD

This disclosure relates to an assembly for a computer system, in particular, for a desktop PC or a tower PC. The disclosure further relates to a cable covering unit for such an assembly.

BACKGROUND

Computer systems with a computer chassis are well known. Typically, a connector panel is provided on a back panel of the computer chassis, into which external components such as peripheral devices can be plugged via plug connectors and be connected to the computer system in a signaling manner.

Such systems come with the disadvantage that the connector panel is easily accessible from the outside and plugged peripheral devices can easily be stolen and/or manipulated. Such problems occur in large offices with a plurality of computer systems.

It could therefore be helpful to provide a computer system that contributes to protection against theft and/or manipulation of external components connected to the connector panel and characterized by a simple structure and easy mounting.

SUMMARY

We provide an assembly for a computer system including a computer chassis having a back panel with a connector panel; a cable covering unit fixable in a mounting position to the back panel that prevents connected plug connectors from being unplugged from the connector panel in the mounting position; wherein the cable covering unit and the computer chassis are arranged such that the cable covering unit can be placed on the computer chassis in an articulated manner to be fixed thereto and subsequently pivoted toward the back panel into the mounting position.

We also provide a cable covering unit for the assembly, wherein the cable covering unit is mountable to a back panel of a computer chassis and prevents unplugging of plug connectors connected to the connector panel of the back panel in the mounted state; and the cable covering unit and the computer chassis are designed such that the cable covering unit can be placed on the computer chassis in an articulated manner to be mounted thereto and subsequently pivoted toward the back panel into the mounting position.

LIST OF REFERENCE NUMERALS

Figure 1:
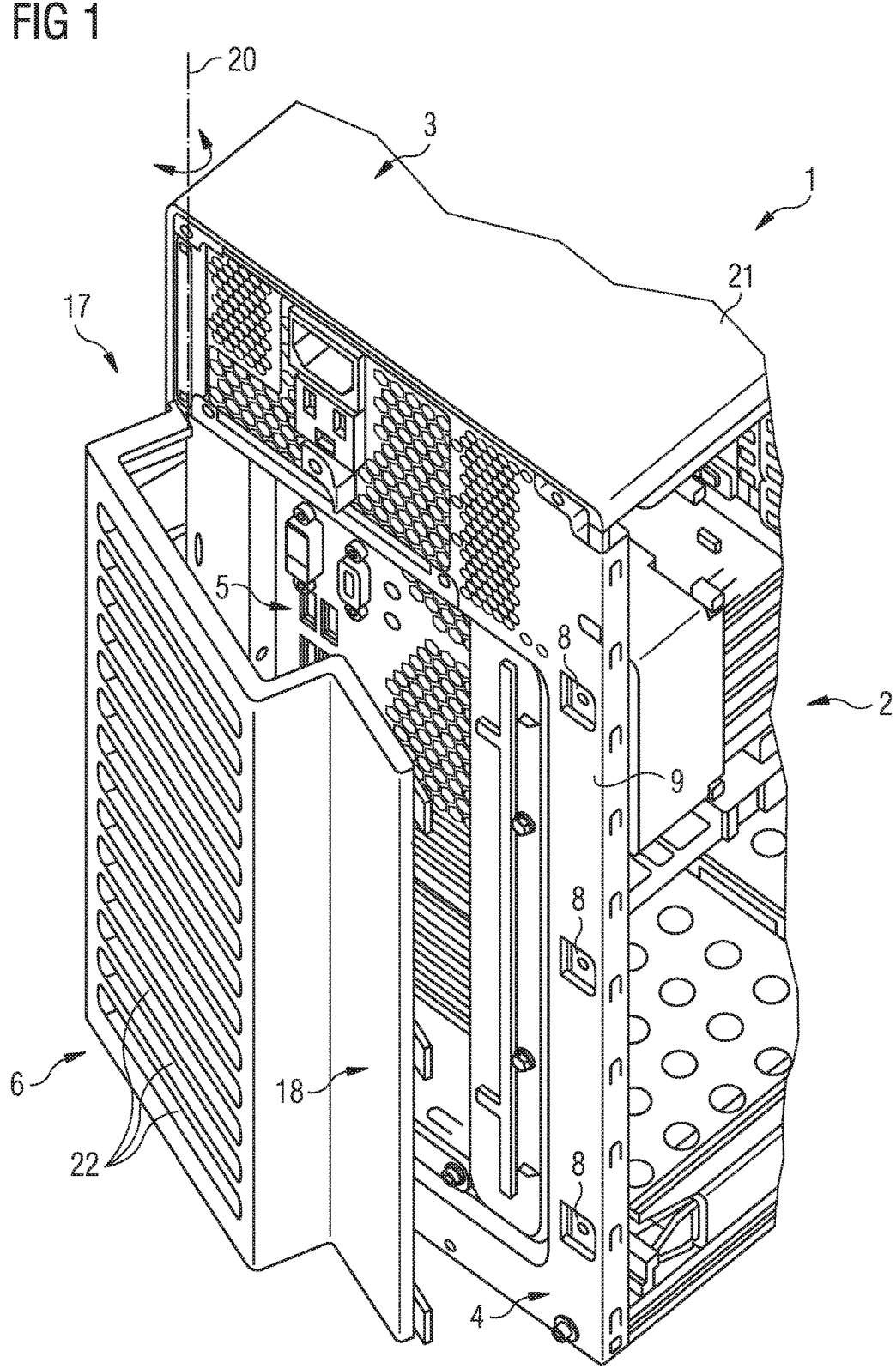
FIG. 1 shows an assembly for a computer system with a computer chassis and a cable covering unit in a perspective view.

1 Assembly
2 computer system
3 computer chassis
4 back panel
5 connector panel
6 cable covering unit
7 flange element
8 recess
9 outer face
10 locking pin
11 opening
12 housing side
13 hooking element
14 housing element
15 radius
16 radius
17 first end region
18 second end region
19 joint
20 vertical axis
21 housing cover
22 openings
23 end
24 tab
25 Kensington lock

DETAILED DESCRIPTION

We provide an assembly for a computer system, in particular, for a desktop pc or a tower pc. The assembly comprises a computer chassis having a back panel with a connector panel. The assembly further comprises a cable covering unit fixable to the back panel and prevents the connected plug connector from being unplugged from the connector panel in the mounting position. The cable covering unit and the computer chassis are designed such that the cable covering unit can be placed on the computer chassis in an articulated manner to be fixed thereto and subsequently can be pivoted into the mounting position toward the back panel.

The assembly contributes to an easy mounting and establishment of an effective anti-theft and manipulation protection, respectively. To mount the cable covering unit, the unit merely has to be placed on the computer chassis, in particular the back panel or a side panel of the computer chassis, in an articulated manner, and subsequently pivoted toward the back panel, i.e. in the direction of the back panel. The cable covering unit is designed such that the unit in the mounted state prevents the connected plug connectors from being unplugged. For example, the cable covering unit has a shape such as to allow cables to be guided from the connector panel to the outside, thereby preventing access to the plug connectors effectively at the same time. In particular, this prevents the plug connectors from being unplugged.

The cable covering unit can be placed on the computer chassis in a form-fit manner, for example. The form-fit contributes to the fact that the cable covering unit is guided on the chassis and can be pivoted in the further mounting step. In this context, the phrase "can be placed in an articulated manner" means, for example, that some type of joint-connection is formed when placing the cable covering unit on the chassis. As a result, the cable covering unit is pivotable about a pivot axis running in parallel to the back panel, for example. In other words, such placement achieves hinge effects when pivoting the cable covering unit. The mounting position relates to a final position of the cable covering unit, for example, in which the cable covering unit partially or completely covers the connector panel with the function described above. In other words, the cable covering unit is placed-on with one end and pivoted about that end. The cable covering unit is externally attached to the computer chassis. After pivoting in the mounting position, the cable covering unit is already fixed to the chassis by latching with the chassis or is subsequently fixed by fixing elements. The elements are e.g. fixing elements or additional elements such as housing components, housing panels or side panels.

The cable covering unit can be mounted without using any tools, screws or other fixing elements, for example. Furthermore, requirements in regards to EMC-compatibility can be met.

The cable covering unit may comprise a hooking element by which the cable covering unit can be hooked in the computer chassis and by which the cable covering unit is pivotable. The hook(ing) contributes to an easy positioning of the cable covering unit on the computer chassis. For example, hooking ensures a defined rotation or a defined pivoting of the cable covering unit toward the back panel. The hooking element can also be referred to as a hooking means. As an alternative, multiple hooking means can also be provided, for example, along one side of the cable covering unit.

The hooking element may be a bent tab that engages behind a housing element of the computer chassis. As a result, the cable covering unit is securely locked with the computer chassis after being placed-on thereon. The bent tab allows for pivoting about the housing element. For example, the housing element is an opening, a protrusion or a curvature or a seam of the computer chassis or a panel of the chassis, respectively.

The bent tab may have a predetermined radius adapted to a respective radius of the housing element. In other words, the housing element has a roundness or curvature and can also be referred to as a bent element. This contributes to the hinge effect, e.g. to formation of a rotary joint.

The cable covering unit may comprise a flange element engaging with the computer chassis after being pivoted into the mounting position. The flange element can also be referred to as engaging element or engaging means. As an alternative, multiple flange elements are provided. By the flange element, the cable covering unit can be securely fixed or arranged on the computer chassis, e.g. the back panel, after the pivoting process. The flange element engages the back panel of the computer chassis in a form-fit manner, for example. This contributes to the cable covering unit being securely held after being pivoted in the mounting position. This is advantageous for possible subsequent installation work to finally fix the cable covering unit, for example.

The back panel of the computer chassis may comprise a recess in which the flange element of the cable covering unit is received in the mounting position. The recess is adapted to a shape of the flange element, for example. The recess is configured as a depression or a reception tray, for example. The recess is produced by a forming process such as impressing, bending or punching.

The flange element may be received in the recess such that at least one part of the flange element does not protrude from an outer face of the back panel surrounding the recess, for example. The flange element terminates flush with the outer face of the back panel, for example. In other words, the flange element does not protrude from the outer face of the back panel. The flange element is countersunk with the recess, for example. Therefore, it is possible to mechanically secure the cable covering unit on the back panel by a further element in that the further element is attached to the outer face of the back panel such that, in particular in a planar fashion, the further element at least partially covers the flange element located in the recess. Thereby, the flange element is held in the recess. The further element can be a housing panel or side panel of the computer chassis, for example.

The flange element may comprise a locking pin and the recess may comprise an opening in which the locking pin is inserted in the mounting position of the cable covering unit. The cable covering unit is thereby securely locked on the back panel after being pivoted in the mounting position. The locking pin contributes to a defined positioning or centering. This may be advantageous for a pre-mounting process, for example, if the cable covering unit is subsequently secured to the computer chassis by a further element.

The locking pin may latch or clamp with the back panel. The locking pin is a single-slotted or double-slotted locking pin which is slightly spread, for example. When guiding the locking pin through the opening, initially the pin is compressed and subsequently expands after an at least partial passage through the opening. However, other latching or clamping mechanisms are possible as well. The locking pin can be configured in the type of a hook or a mandrel, for example. Additionally, or as an alternative, the locking pin is configured in a resilient manner.

The assembly may comprise a housing side fixed to the computer chassis such that the cable covering unit is mechanically secured on the computer chassis in the mounting position. By mounting the housing side, the cable covering unit is prevented from pivoting out of the mounting position. The cable covering unit is secured by the housing side in a form-fit manner, for example. This notably contributes to the fact that fixing elements or tools are not required to mount the cable covering unit per se.

The assembly may comprise a locking element that protects the housing side fixed to the computer chassis from being removed from the computer chassis. The locking element is a Kensington lock or another lock such as a padlock, for example. This notably contributes to an effective anti-theft protection, wherein the cable covering unit cannot be removed without causing physical damage to the computer system or the cable covering unit per se.

The housing side may at least partially cover a flange element of the cable covering unit, which is received in a recess of the back panel after pivoting the cable covering unit into the mounting position. Thereby, the cable covering unit is fixed to the back panel, as described above. A tab of the housing side covers the flange element, for example. Thus, the housing side per se rests on the outer face of the back panel, which surrounds the recess, at least partially flat and parallel to the back panel, for example. Therefore, provisions need not be made to existing side panels or side doors.

The assembly may comprise locking devices that protect the housing side fixed to the computer chassis from being removed from the computer chassis. As described above, this contributes to an effective anti-theft protection.

Furthermore, a cable covering unit for an above-described assembly is described. The cable covering unit can be mounted on a back panel of a computer chassis and prevents unplugging of plug connectors connected to the connector panel of the back panel in the mounted state. The cable covering unit is formed such that it can be placed on the computer chassis for mounting purposes and subsequently be pivoted toward the back panel into a mounting position.

The cable covering unit essentially allows the aforementioned advantages and functions.

Further advantages and functions are disclosed in the subsequent description of an example.

The example is explained using the attached Figures. Like or similar elements are denoted with the like reference numerals throughout the figures.

FIG. 1 shows a perspective detail of an assembly 1 with a computer system 2. The computer system 2 comprises a computer chassis 3. The computer system 2 is a desktop PC. Other computer systems such as a tower PC, a workstation or a so-called All-in-one-PC are possible.

The computer chassis 3 has a housing cover 21 and a back panel 4. The back panel 4 has a connector panel 5, via which external components such as hard drives, mouse, keyboard or the like can be connected or plugged to the computer systems via plug connectors. In particular plug-in cards or terminals of a motherboard located inside the computer chassis 3 can be contacted from the outside.

The assembly 1 further provides a cable covering unit 6, which unit is mounted or fixed to the computer chassis 3, in particular on the back panel 4 of the chassis. The cable covering unit 6 is configured to ensure—in a mounted state—an anti-theft and/or manipulation protection of the connected external components in particular to prevent the plug connectors from being unplugged or disconnected. The cable covering unit 6 comprises a multitude of openings 22 in the form of slots. The cable covering unit 6 has a first end region 17 and an opposite second end region 18.

Figure 2:
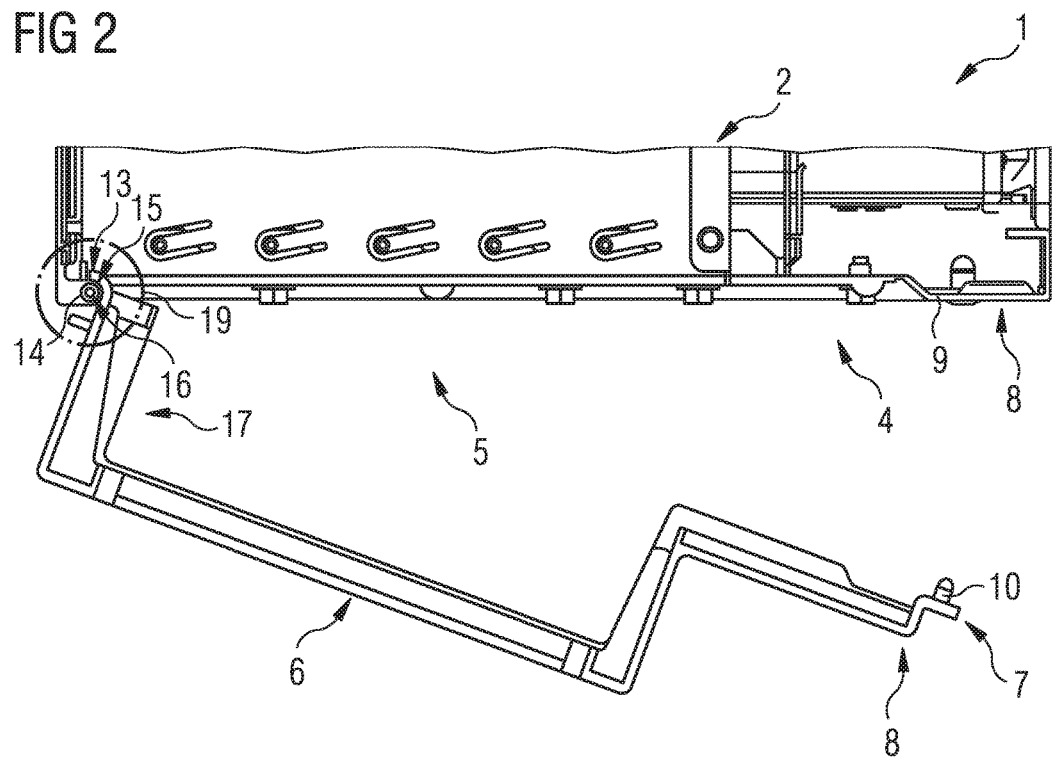
FIG. 2 shows a detail of a plan view of the assembly.

As can be seen from FIG. 2, the cable covering unit 6 has a hooking element 13 formed as a bent tab in the first end region 17. The bent tab is U-shaped and has a predetermined (inner) diameter 15. In the second end region 18, the cable covering unit 6 has flange elements 7, which in each case have one locking pin 10. In the example, the locking pins 10 are integral with the cable covering unit 6, but they may alternatively also be configured as separate components and fixed to the cable covering unit 6.

To mount the cable covering unit 6, the unit as shown in FIG. 1 is placed on the computer chassis 3 in an articulated manner in the first end region 17. The cable covering unit 6 protrudes from the back panel 4 at an angle. This is explained in greater detail in FIGS. 2 and 3.

As shown in FIG. 2, the cable covering unit 6 with the hooking element 13 is placed on the computer chassis 3 via a housing element 14 of the computer chassis 3 such that the bent tab with the predetermined radius 15 engages behind the housing element 14 in a form-fit manner. The cable covering unit 6 is thus hooked-in. The housing element 14 is part of the back panel 4 of another panel of the computer chassis 3 and has a curvature with an external radius 16 adapted to the radius 15 of the hooking element 13. Both the hooking element 13 and the housing element 14 extend normally to the image plan of FIG. 2, i.e. parallel to the back panel 4.

When placing the cable covering unit 6 on the computer chassis 3 as shown in FIG. 2, a joint 19 is formed, which exhibits a type of hinge effect. The cable covering unit 6 may now be pivoted toward the back panel 4 about a vertical axis 20 formed by placing the cable covering unit 6 on the computer chassis 3 as shown in FIG. 1. In other words, rotation is effected about the curvature of the housing element 14. The second end region 18 is pivoted in the direction of the back panel 4.

Figure 3:
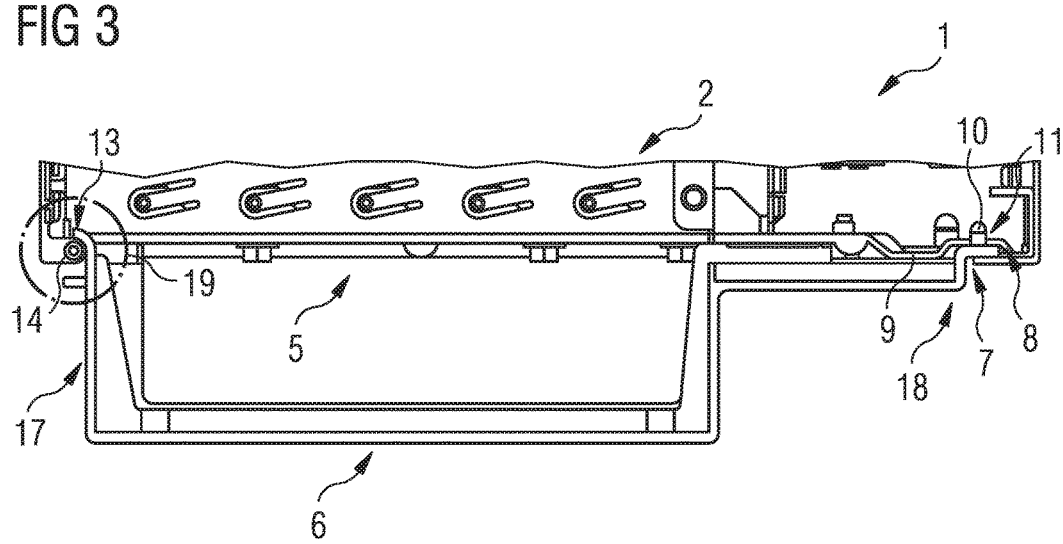
FIG. 3 shows another detail of a plan view of the assembly.

As can be discerned from FIGS. 1 to 3, one respective recess 8 is formed in the back panel 4 for each flange element 7. The recesses 8 are formed into the back panel by a forming method such as impressing, punching or bending.

The final mounting position of the cable covering unit 6 is shown in FIG. 3. The flange elements 7, which are flat tabs in the example, engage into the recesses 8 such that the flange elements terminate flush with the outer face 9 of the back panel 4 surrounding the recesses 8. In other words, the flange elements 7 are countersunk with the recesses 8. The locking pins 10 pass through respective openings 11 of the recesses 8.

Figure 4:
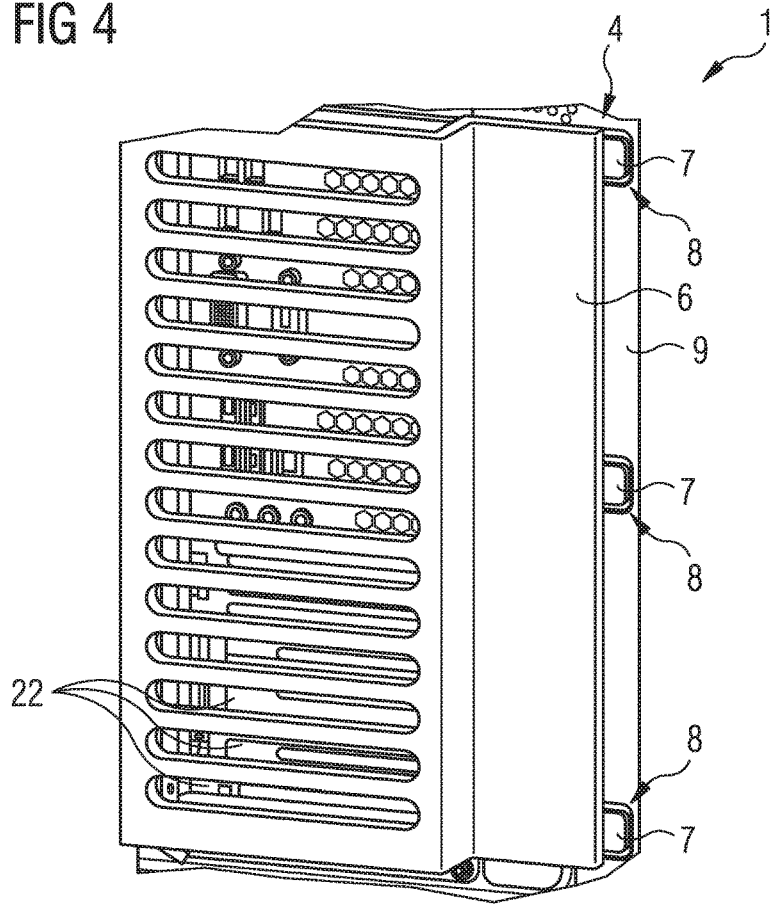
FIG. 4 shows another perspective view of the assembly.

In the state shown in FIG. 3, the cable covering unit 6 is held on the computer chassis 3 insofar as that the unit does not fall off the back panel 4 under normal circumstances. In this state, only one degree of freedom remains, by which the cable covering unit 6 can be pivoted back, for example, into the position shown in FIG. 1. The final mounting position is also illustrated in FIG. 4 in a perspective view.

Optionally, locking pins 10 latch with the back panel 4 via the openings 11, as described above.

Figure 5:
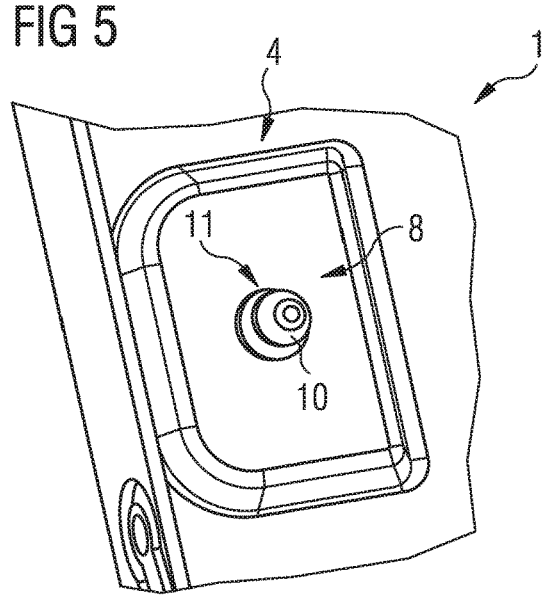
FIG. 5 shows a perspective, detailed view of the assembly.
Figure 6:
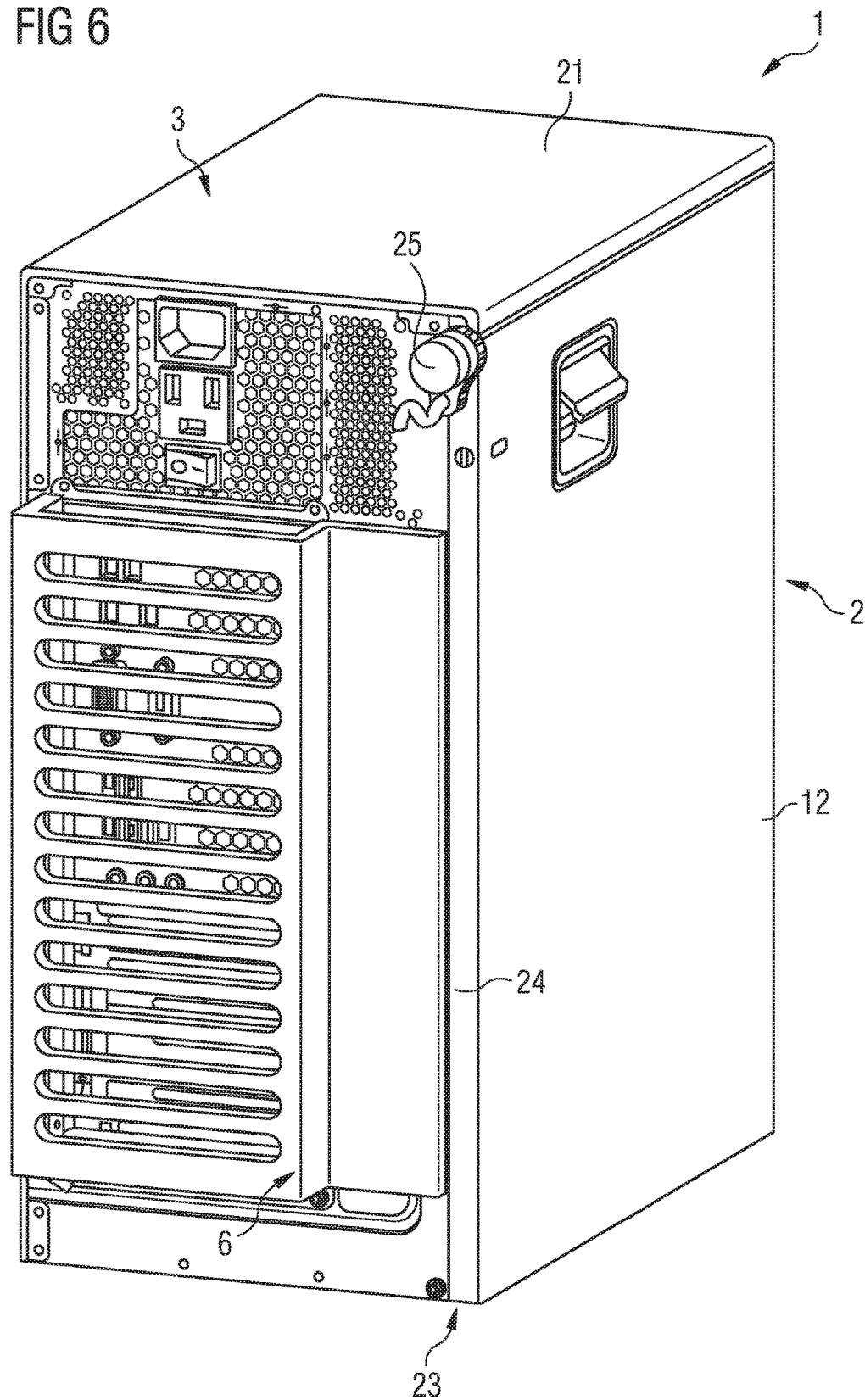
FIG. 6 shows a perspective view of the assembly in a completely mounted state.

FIG. 5 shows the engagement of the flange elements 7 and holding points 10, as just described, from an inner side of the computer chassis 3. It can be discerned that the holding pins 10 are designed in the type of a mandrel, e.g. conical or tapering toward the end. This contributes to the fact that when pivoting the cable covering unit 6, a centering or positioning of the cable covering unit 6 is enforced.

Pivoting of the cable covering unit 6 contributes to a particularly easy mounting process, independent from the extent by which the cable covering unit 6 is fixed to the chassis 3 in further mounting steps, as described below. In examples not shown, no further measures are required to mount the cable covering unit 6 if the cable covering unit 6 latches with the back panel 4, for example, and is thus securely fixed.

To mechanically secure the cable covering unit 6 in the mounting position, namely suppress all degrees of freedom, another housing side 12 such as a side panel or a side door is subsequently mounted to the computer chassis 3. The housing side 12 has a housing tab 24 which is 90° angled-off by 90° on the end 22 facing the back panel 4, which essentially runs parallel to the back panel 4 or the outer face 9 thereof in the region of the recesses 8. The housing tab 24 in the fixed state covers the flange elements 7, which are arranged in a recess 8 such that a back-pivoting of the cable covering unit 6 is prevented. In other words, the cable covering unit 6 is now undetachably mounted to the back panel 4, with the back panel 4 being held by the housing side 12 and the hooking elements 13. For example, the housing tab 24 terminates flush with the housing side 9, e.g. rests against the outer face 9 and/or the flange elements 7 in a contacting manner. Other housing elements may also be provided, e.g. one or more individual sheet metal tabs that lock the flange elements 7 to the back panel.

The cable covering unit 6 is designed such that the unit prevents plug connectors connected to the connector panel 5 from being unplugged under normal circumstances. In the example, the cable covering unit 6 completely covers the connector panel 5. Depending on the position of the connector panel 5 and the plug connectors (sockets) thereof, it is sufficient for the cable covering unit 6 to only partially cover the connector panel 5. Cables leading to such plug connectors are readily guided outwards via a top side and/or a bottom side of the cable covering unit 6. The openings 22 of the cable covering unit formed in the area of the cable covering unit 6 essentially opposite the connector panel ensure that a supply or discharge of cooling air from the computer chassis 3 is not or only insignificantly affected. Other configurations of openings 22 are possible. Due to predetermined dimensions of components inside the chassis 3 such as of a motherboard, the connector panel 5 is offset inward relative to an outer face 9 of the back panel 4 as shown in FIG. 4. This allows for designing the cable covering unit 6 in a space-saving manner. In other words, the cable covering unit 6 can be of esthetical design and protrudes only slightly from the back panel 4. However, it is not a requirement for the chassis 3 to have a connector panel 5 which is offset inwards. In the example, the cable covering unit 6 has a rigid design and is made of a plastic material. Alternative materials are possible as well, however, attention must be paid to the fact that the cable covering unit 6 has to meet its purpose of being an effective protection against manipulation and/or theft.

Optionally, the housing side 12 is locked by a Kensington lock 25, which constitutes a locking device, with the computer chassis 3. As a result, it is not possible to remove the housing side 12 and, thus, the cable covering unit 6 from the computer chassis 3. Thus, an effective anti-theft protection is ensured. As an alternative, other protection measures are possible.

The invention claimed is:

1. An assembly for a computer system comprising:
a computer chassis having a back panel with a connector panel; and
a cable covering unit fixable in a mounting position to the back panel;
wherein the cable covering unit is adapted to prevent connected plug connectors from being unplugged from the connector panel in the mounting position,
the cable covering unit comprises a hooking element that is a bent tab by which the cable covering unit can be hooked in the computer chassis,
the bent tab engages behind a housing element of the computer chassis,
the bent tab has a predetermined radius adapted to a respective roundness of the housing element such that the cable covering unit can be placed on the computer chassis in an articulated manner to form a rotary joint and is fixed thereto, and
subsequently, the cable covering unit can be pivoted toward the back panel into the mounting position.

2. The assembly according to claim 1, wherein the cable covering unit comprises a flange element that engages with the computer chassis after pivoting in the mounting position.

3. The assembly according to claim 2, wherein the back panel of the computer chassis comprises a recess in which the flange element of the cable covering unit is received in the mounting position.

4. The assembly according to claim 3, wherein the flange element is received in the recess such that at least one part of the flange element does not protrude from an outer face of the back panel, which surrounds the recess.

5. The assembly according to claim 4, wherein the flange element comprises a locking pin and the recess comprises an opening in which the locking pin is inserted in the mounting position of the cable covering unit.

6. The assembly according to claim 3, wherein the flange element comprises a locking pin and the recess comprises an opening in which the locking pin is inserted in the mounting position of the cable covering unit.

7. The assembly according to claim 1, further comprising a housing side fixed to the computer chassis such that the cable covering unit is mechanically secured on the computer chassis in the mounting position.

8. The assembly according to claim 7, wherein the housing side at least partially covers a flange element of the cable covering unit, which is received in a recess of the back panel after pivoting of said unit into the mounting position.

9. The assembly according to claim 8, further comprising a locking device that prevents the housing side fixed to the computer chassis from being removed from the computer chassis.

10. The assembly according to claim 7, further comprising a locking device that prevents the housing side fixed to the computer chassis from being removed from the computer chassis.

11. The assembly according to claim 1, further comprising a flange element that terminates flush with an outer face of the back panel.

12. The assembly according to claim 11, wherein the flange element is countersunk with a recess in the back panel.

* * * * *